No. 722,193. PATENTED MAR. 3, 1903.
J. WESTLEY.
STEAM TRAP.
APPLICATION FILED JULY 28, 1902.
NO MODEL. 2 SHEETS—SHEET 1.

Witnesses
Inventor
James Westley
by Richards Co
Attorneys

No. 722,193. PATENTED MAR. 3, 1903.
J. WESTLEY.
STEAM TRAP.
APPLICATION FILED JULY 28, 1902.
NO MODEL. 2 SHEETS—SHEET 2.

Witnesses

Inventor
James Westley
by Richards & Co.
Attorneys

UNITED STATES PATENT OFFICE.

JAMES WESTLEY, OF LEVENSHULME, ENGLAND, ASSIGNOR OF TWO-THIRDS TO FREDERICK FOSTER AND WILLIAM RHODES BOOTLAND, OF MANCHESTER, ENGLAND.

STEAM-TRAP.

SPECIFICATION forming part of Letters Patent No. 722,193, dated March 3, 1903.

Application filed July 28, 1902. Serial No. 117,351. (No model.)

*To all whom it may concern:*

Be it known that I, JAMES WESTLEY, brass-founder, a subject of the King of Great Britain and Ireland, residing at 1 Wesley street, Levenshulme, in the county of Lancaster, England, have invented an Improved Steam-Trap, (for which I have made application in Great Britain, No. 2,908, dated the 5th day of February, 1902,) of which the following is a specification.

My invention relates to steam-traps used for removing water of condensation from steam cylinders, cisterns, pipes, and the like, as is well understood.

The accompanying drawings clearly illustrate my invention.

Figure 1:
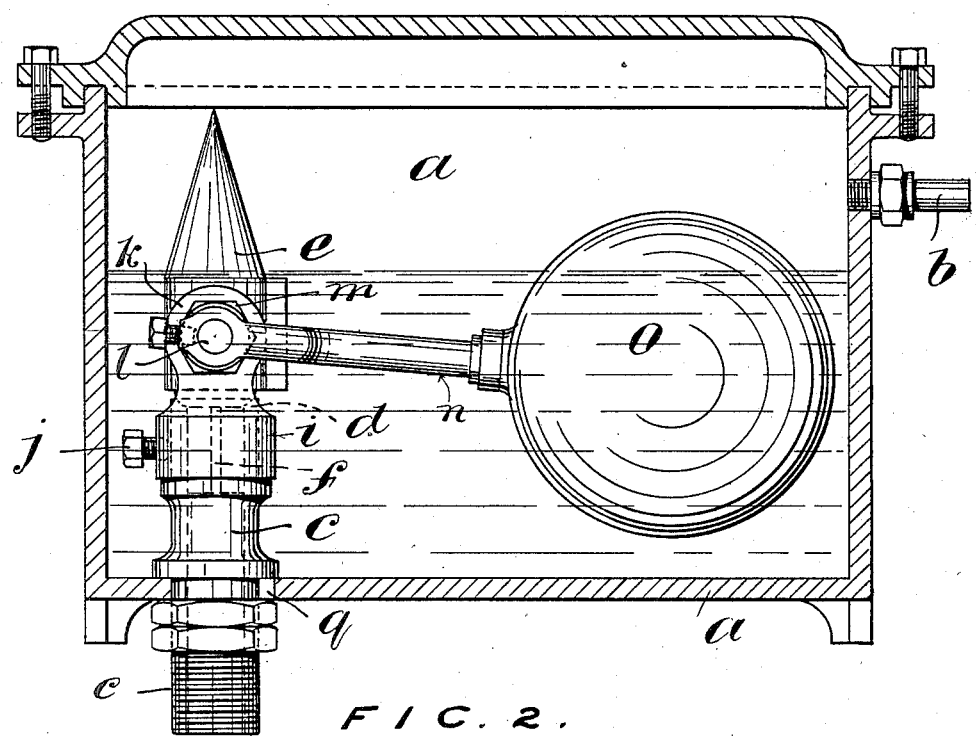
Figure 2:
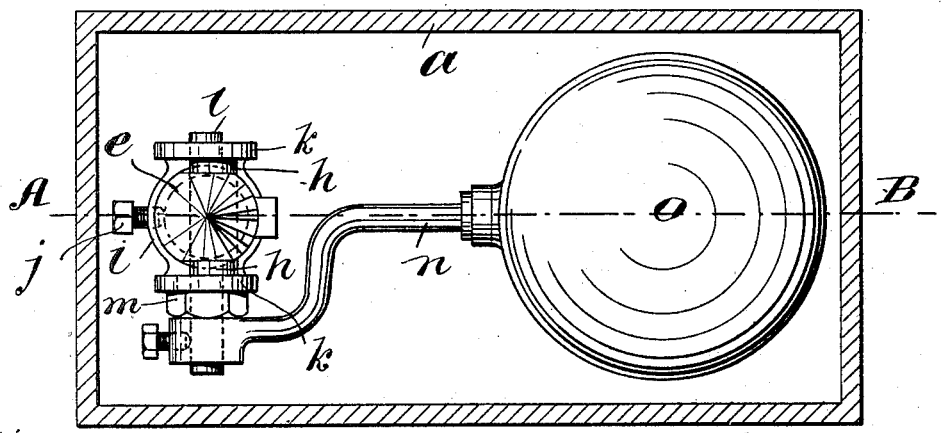
Figure 3:
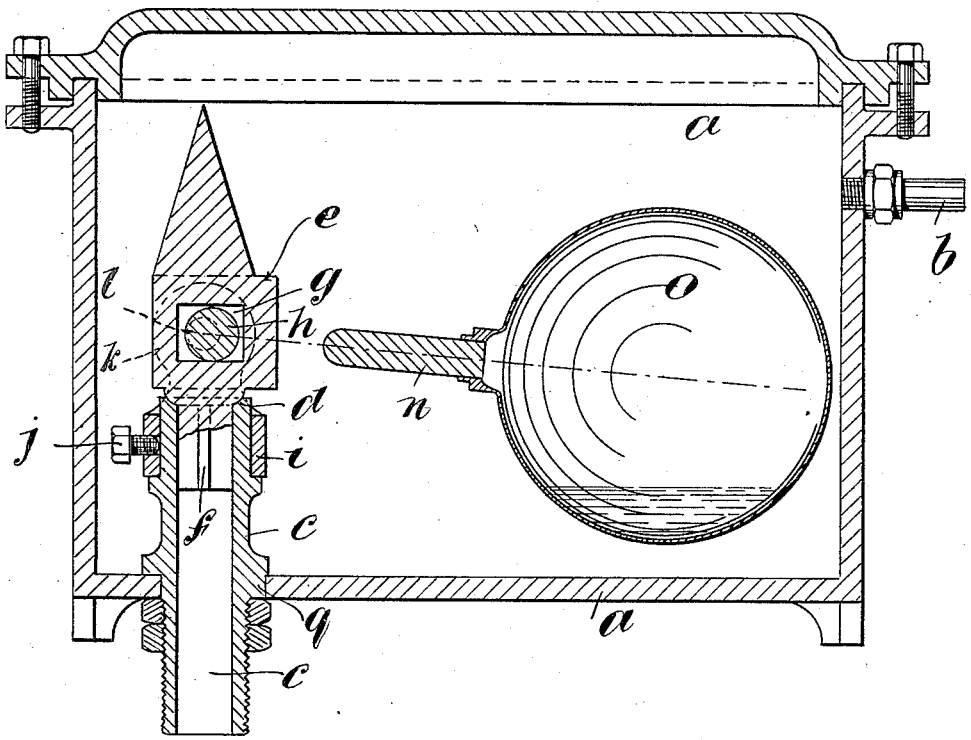
Figures 4, 5:
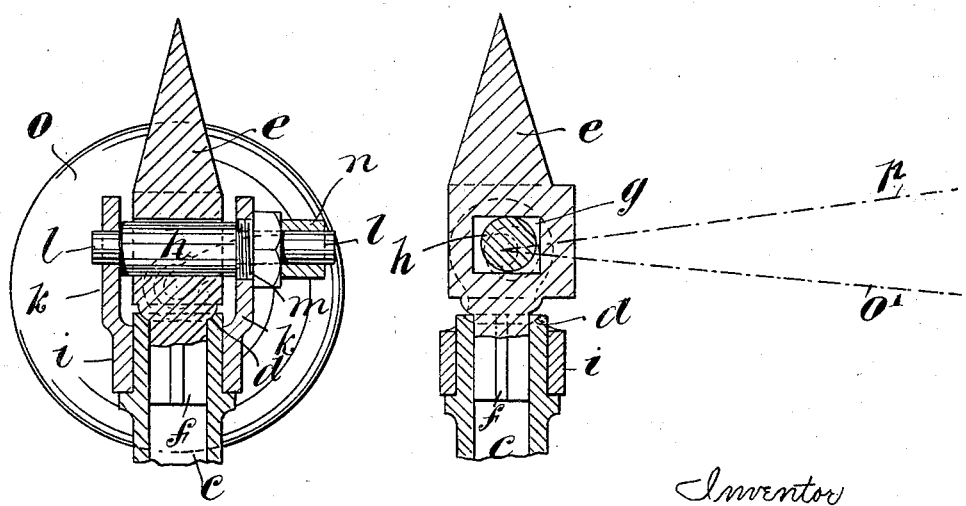

Figure 1 shows the improved steam-trap in elevation, the chamber being shown in section. Fig. 2 is a plan view thereof. Fig. 3 is a sectional elevation on the line A B, Fig. 2. Fig. 4 is a sectional end view of the valve and seating of the trap. Fig. 5 is the valve in section, showing the valve off its seat.

In carrying my invention into effect I provide a suitable metallic box or vessel $a$ of any convenient size and shape, which is placed in communication with the steam cistern or pipe at $b$. Live steam has direct access to the chamber $a$, and I construct the box sufficiently strong and fluid-tight to withstand the boiler or steam pressure.

The bottom of the trap is provided with a pipe $c$ to remove the water flowing into the trap from the steam pipe or cistern, the upper part of the pipe $c$ being formed with the valve-seating $d$.

The pipe $c$ is secured to the chamber $a$ by means of nuts and is prevented from rotating by a feather $q$, occupying a gap in the bottom of the chamber $a$.

I provide a valve $e$ governing the valve-seat, the valve being formed with or carrying rings $f$ to guide the valve upon its seat. To operate this valve $e$, I form the body of it with an aperture or slot $g$, within which is mounted a rotatable eccentric or cam $h$. The rotation of this eccentric raises or lowers the valve, according to the direction of the movement of the eccentric. This will be apparent from an inspection of the sectional view Fig. 3.

As shown in Figs. 1 and 3, the water contained within the chamber $a$ of the trap is at its normal level, and the eccentric $h$ operates to close the valve $e$ upon its seat. Upon the upper part of the pipe or tube $c$ is placed a sleeve $i$, secured to the tube by means of a set-screw $j$. The sleeve $i$ is formed with side cheeks $k$, which provide bearings for the pins $l$ of the eccentric $h$. The eccentric $h$ abuts against the inner sides of the cheeks $k$. One of the cheeks $k$ is bored out large enough to permit the passage of the eccentric $h$, the aperture being closed by a screwed plug $m$, which also receives one of the pins $l$ of the eccentric. To this projecting end of the pin $l$ I secure the arm $n$ of a closed ball-float $o$. The arm $n$ is cranked, as shown in Fig. 2, to adjust the ball-float in a line with the valve. Before the ball-float is hermetically sealed I introduce therein a small quantity of water. When the trap is working, steam is generated from this water, maintaining a pressure in the ball about equal to the pressure on the outside, thus preventing the ball from collapsing under such outside pressure. The position of the eccentric $h$ is arranged to close the valve when there is not a sufficiency of water within the trap to raise the ball-float to a certain height, as clearly shown in Fig. 3. The ball-float gradually rises as water accumulates in the trap. A slight clearance is provided between the top of the slot $g$ and the eccentric, so that the eccentric may turn to some extent as the ball-float rises without raising the valve off the seat.

In Fig. 5 the dotted line $o'$ indicates the center line of the ball-float when the valve is closed. The dotted line $p$ indicates the center line of the float when it has been lifted by a sudden influx of water. The eccentric is then rotated in the position shown in Fig. 5 and the valve $e$ is lifted off its seat, the dotted circle showing the position of the eccentric when the valve is closed. The water is then rapidly drained out of the trap through the pipe $c$ without any loss of steam, as before the water-level can be reduced to the valve-seat the ball-float has sunk sufficiently to close the valve. The trap thus works with a minimum loss of steam and is, moreover, noiseless in action.

I declare that what I claim is—

The improved steam-trap consisting of a pressure-proof chamber $a$, a water-outlet pipe $c$ having a valve-seating $d$, a valve $e$ governing the water-outlet and an eccentric $h$ rotated by the rise and fall of a ball-float to operate the valve all arranged and acting in the manner and substantially as described and illustrated.

In witness whereof I have hereunto set my hand in presence of two witnesses.

JAMES WESTLEY.

Witnesses:
  JOSHUA ENTWISLE,
  NORMAN KIERNAN.